US005636358A

United States Patent [19]
Brant et al.

[11] Patent Number: 5,636,358
[45] Date of Patent: Jun. 3, 1997

[54] METHOD AND APPARATUS FOR TRANSFERRING DATA IN A STORAGE DEVICE INCLUDING A DUAL-PORT BUFFER

[75] Inventors: William A. Brant; Gerald L. Hohenstein, both of Boulder, Colo.

[73] Assignee: EMC Corporation, Hopkinton, Mass.

[21] Appl. No.: 217,126

[22] Filed: Mar. 24, 1994

Related U.S. Application Data

[63] Continuation of Ser. No. 766,771, Sep. 27, 1991, abandoned.
[51] Int. Cl.⁶ ............................................. G06F 12/08
[52] U.S. Cl. .............................. 395/444; 395/250; 395/441
[58] Field of Search .............................. 364/200 MS File, 364/900 MS File; 395/400, 425, 440, 441, 458, 476, 444, 872, 873, 250

[56] References Cited

U.S. PATENT DOCUMENTS

| | | | |
|---|---|---|---|
| 3,893,178 | 7/1975 | Sordello | 360/73 |
| 4,092,732 | 5/1978 | Ouchi | 395/575 |
| 4,467,421 | 8/1984 | White | 395/425 |
| 4,562,576 | 12/1985 | Ratcliffe | 371/21 |
| 4,667,326 | 5/1987 | Young et al. | 371/39.1 |
| 4,722,085 | 1/1988 | Flora et al. | 371/38 |
| 4,754,397 | 6/1988 | Varaiya et al. | 361/380 |
| 4,761,785 | 8/1988 | Clark et al. | 371/51 |
| 4,768,193 | 8/1988 | Takemae | 371/10 |
| 4,775,978 | 10/1988 | Hartness | 371/38 |
| 4,796,232 | 1/1989 | House | 365/189 |
| 4,811,280 | 3/1989 | Berkowitz et al. | 395/440 |
| 4,817,035 | 3/1989 | Timsit | 395/425 |
| 4,849,929 | 7/1989 | Timsit | 395/57 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,993,030 | 2/1991 | Krakauer et al. | 371/40.1 |
| 5,034,914 | 7/1991 | Osterlund | 395/872 |
| 5,073,851 | 12/1991 | Masterson et al. | 395/425 |
| 5,115,411 | 5/1992 | Kass et al. | 365/189.01 |
| 5,146,576 | 9/1992 | Beardsley et al. | 395/425 |
| 5,157,775 | 10/1992 | Sanger | 395/425 |
| 5,247,649 | 9/1993 | Bandoh | 395/458 |
| 5,258,843 | 11/1993 | Truong | 358/183 |
| 5,261,064 | 11/1993 | Wyland | 395/400 |
| 5,265,145 | 11/1993 | Brady et al. | 395/441 |
| 5,274,790 | 12/1993 | Suzuki | 395/458 |
| 5,276,850 | 1/1994 | Sakaue | 395/425 |
| 5,287,480 | 2/1994 | Wahr | 395/458 |
| 5,291,609 | 3/1994 | Herz | 395/872 |
| 5,402,428 | 3/1995 | Kakuta et al. | 395/441 |
| 5,410,666 | 4/1995 | Nakano et al. | 395/441 |

OTHER PUBLICATIONS

"TMS 44C251 262,144 Ey 4–Bit Multiport Video RAM" by Texas Instruments, 1988, pp. 4–79, 80 and 4–117, 118.
Gibson, G.A., Performance and Reliability in Redundant Arrays of Inexpensive Disks (Date Unknown).
Chen, P., An Evaluation of Redundant Arrays of Disks Using an Amdahl 5890; (May 1989).

(List continued on next page.)

*Primary Examiner*—Eddie P. Chan
*Assistant Examiner*—Hiep T. Nguyen
*Attorney, Agent, or Firm*—William J. Kubida; Richard A. Bachand; Holland & Hart LLP

[57] ABSTRACT

A computer storage system having a dual port buffer memory for improved performance. The invention comprises a computer storage subsystem that includes a dual port buffer memory that effectively provides two internal data busses for the storage subsystem: one bus for data transfers between the dual port buffer memory and the storage units, and a second bus for data transfers between the dual port buffer memory and a CPU. The throughput of the storage subsystem is roughly equivalent to the bandwidth of the slower of the two busses. In alternative configurations, the invention may use a plurality of dual port buffer memories in parallel to increase the effective throughput of the storage subsystem, and better match the bandwidth of the two busses.

7 Claims, 2 Drawing Sheets

OTHER PUBLICATIONS

Katz, R.H., Gibson, G.A., and Patterson, D.A.,; Disk System Architectures for High Performance Computing (Mar. 1989).

Gray, J., Horst, B., and Walker, M.; Parity Striping of Disc Arrays: Low–Cost Reliable Storage with Acceptable Throughtput (Jan. 1990).

Schultz, M.E.; Considerations in the Design of a Raid Prototype (Aug. 1988).

Clark, and Corrigan; IBM Systems Journal, vol. 23, No.3, 1989.

Patterson, D.a., Gibson, G., and Katz, H.; A Case For Redundant Arrays of Inexpensive Disks (RAID).

Lee, E.K.; Software and Performance Issues in the Implementation of a RAID Prototype (May 1990).

Chen, P., Gibson, G., Katz, R.H., Patterson, D.A., and Schulze, M.; Introduction to Redundant Arrays of Inexpensive Disks (RAID (Dec. 1988).

Chen, P., Gibson, G., Katz, R.H., Patterson, D.A., and Schulze, M., et al. Evolution of the Raid 2 Architecture (Jun. 12, 1990).

Maximum Strategy, Inc., San Jose, CA; Strategy 2 Disk Array Controller Operation Manual (Nov. 2, 1988).

Maximum Strategy, Inc., San Jose, CA; Strategy 1 Disk Array Controller Operation Manual (Date unknown).

METHOD AND APPARATUS FOR TRANSFERRING DATA IN A STORAGE DEVICE INCLUDING A DUAL-PORT BUFFER

This is a continuation of application Ser. No. 07/766,771 filed on Sep. 27, 1991, now abandoned.

BACKGROUND OF THE INVENTION

1. Field of the Invention

This invention relates to computer storage systems, and more particularly to a computer storage system having a dual port buffer memory for improved performance.

2. Description of Related Art

A typical data processing system generally includes one or more storage units connected to at least one central processor unit (CPU). The function of the storage units is to store data and programs which the CPU uses in performing particular data processing tasks. Various types of storage units are used in current computer systems. A typical computer system may include one or more large capacity tape units and/or disk drives (magnetic, optical, or semiconductor).

Recently, disk array systems of various types have also been used to provide data storage for computer systems. Disk array systems comprise a plurality of storage units coupled in a redundant configuration such that the failure of any one storage unit will not cause a loss of data. A research group at the University of California, Berkeley, in a paper entitled "A Case for Redundant Arrays of Inexpensive Disks (RAID)", Patterson, et al., Proc. ACM SIGMOD, June 1988, has cataloged a number of different types of disk array systems by defining five architectures under the acronym "RAID".

In many modern computer architectures, the CPU does not directly control attached storage units. Rather, the CPU is coupled to a storage subsystem independently controlled by a storage unit controller. A local microprocessor unit (MPU) in the storage unit controller accepts data requests (e.g., READ or WRITE commands) from a CPU and thereafter controls the storage unit subsystem to execute the command while the CPU performs other functions.

An advantage of a storage unit controller is the ability of the controller to keep large numbers of relatively slow mass storage units busy a high percentage of the time. This is particularly important with respect to redundant array storage systems, because failure to keep all of the storage units active results in an under-utilized resource. Therefore, the MPU must always be able to provide any available storage unit with a task in order to achieve the highest performance efficiency.

Accordingly, the prior art has taught the use of a large buffer memory coupled to both the CPU and to the storage units in order to disconnect storage unit activity and CPU activity by "staging" data between the two. FIG. 1 is a block diagram of a typical prior art configuration in which a CPU 1 is coupled via a CPU bus 2 to a CPU interface 3 that is part of the storage subsystem. An internal bus 4 within the storage subsystem couples the CPU interface 3 to an MPU 5, a buffer memory 6, and a storage unit interface 7. If the storage subsystem uses a redundant array storage system, a plurality of storage units S1–S5 are coupled to the internal bus 4 through the storage unit interface 7 (five storage units are shown by way of illustration only).

During a WRITE operation, data from the CPU 1 is transferred through the CPU interface 3 and internal bus 4 to the buffer memory 6. Once an entire transaction is stored in the buffer memory 6, the data subsequently is transferred from the buffer memory 6 to the storage units S1–S5 through the storage unit interface 7.

During a READ operation, the reverse path is taken: data from the storage units S1–S5 is transferred through the storage unit interface 7 into the buffer memory 6. Once an entire transaction has been transferred to the buffer memory 6, the data subsequently is transferred from the buffer memory 6 through the CPU interface 3 to the CPU 1.

The buffer memory 6 serves to match the transfer speed of the CPU to the transfer speed of the storage units. Also, in the case of a disk array storage system, the buffer memory 6 is used as a distribution point during WRITE operations and as a collection point during READ operations so that the CPU 1 never sees the data is actually distributed among the plurality of storage units S1–S5 (i.e., data from the CPU may be split among the storage units).

A major disadvantage of the prior art architecture is that data must cross the same data bus twice: once between the CPU 1 and buffer memory 6, and again between the buffer memory 6 and the storage units S1–S5. This characteristic effectively cuts the data bus bandwidth in half, thereby reducing performance of the storage subsystem.

Therefore, a need exists for improving the performance of storage subsystem, and especially redundant array data storage subsystems. In particular, a need exists for providing a higher effective data bus bandwidth in such storage subsystems.

The present invention provides a solution to these problems.

SUMMARY OF THE INVENTION

The present invention comprises a computer storage subsystem that includes a dual port buffer memory that effectively provides two internal data busses for the storage subsystem: one bus for data transfers between the dual port buffer memory and the storage units, and a second bus for data transfers between the dual port buffer memory and a CPU. The throughput of the storage subsystem is roughly equivalent to the bandwidth of the slower of the two busses.

In alternative configurations, the invention may use a plurality of dual port buffer memories in parallel to increase the effective throughput of the storage subsystem, and better match the bandwidth of the two busses.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the drawings refer to like elements.

DETAILED DESCRIPTION OF THE INVENTION

Throughout this description, the preferred embodiment and examples shown should be considered as exemplars, rather than limitations on the present invention.

Architecture of the Invention

Figure 1:
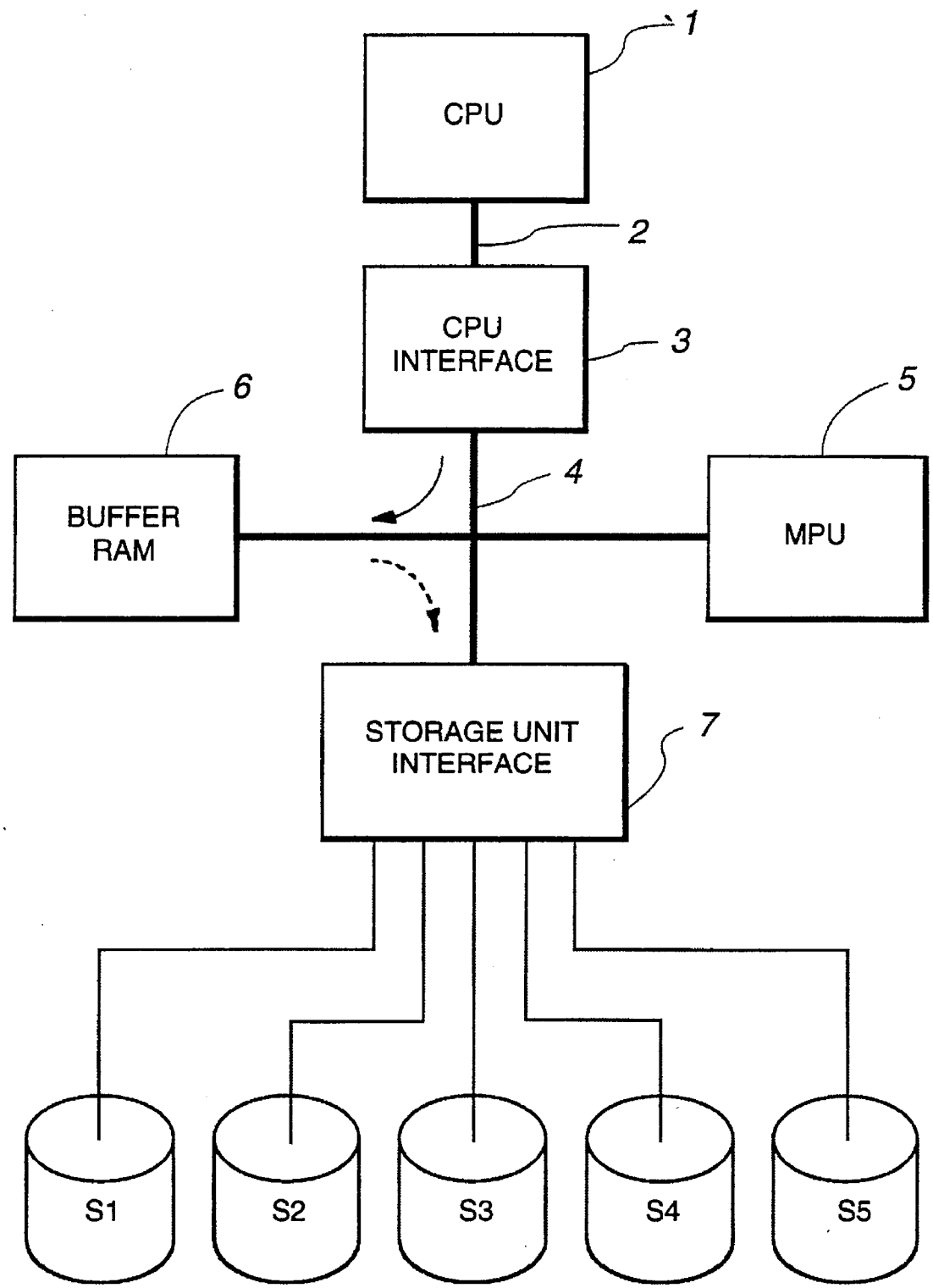
FIG. 1 is block diagram of a prior art computer system having a single port buffer memory in a storage subsystem.
Figure 2:
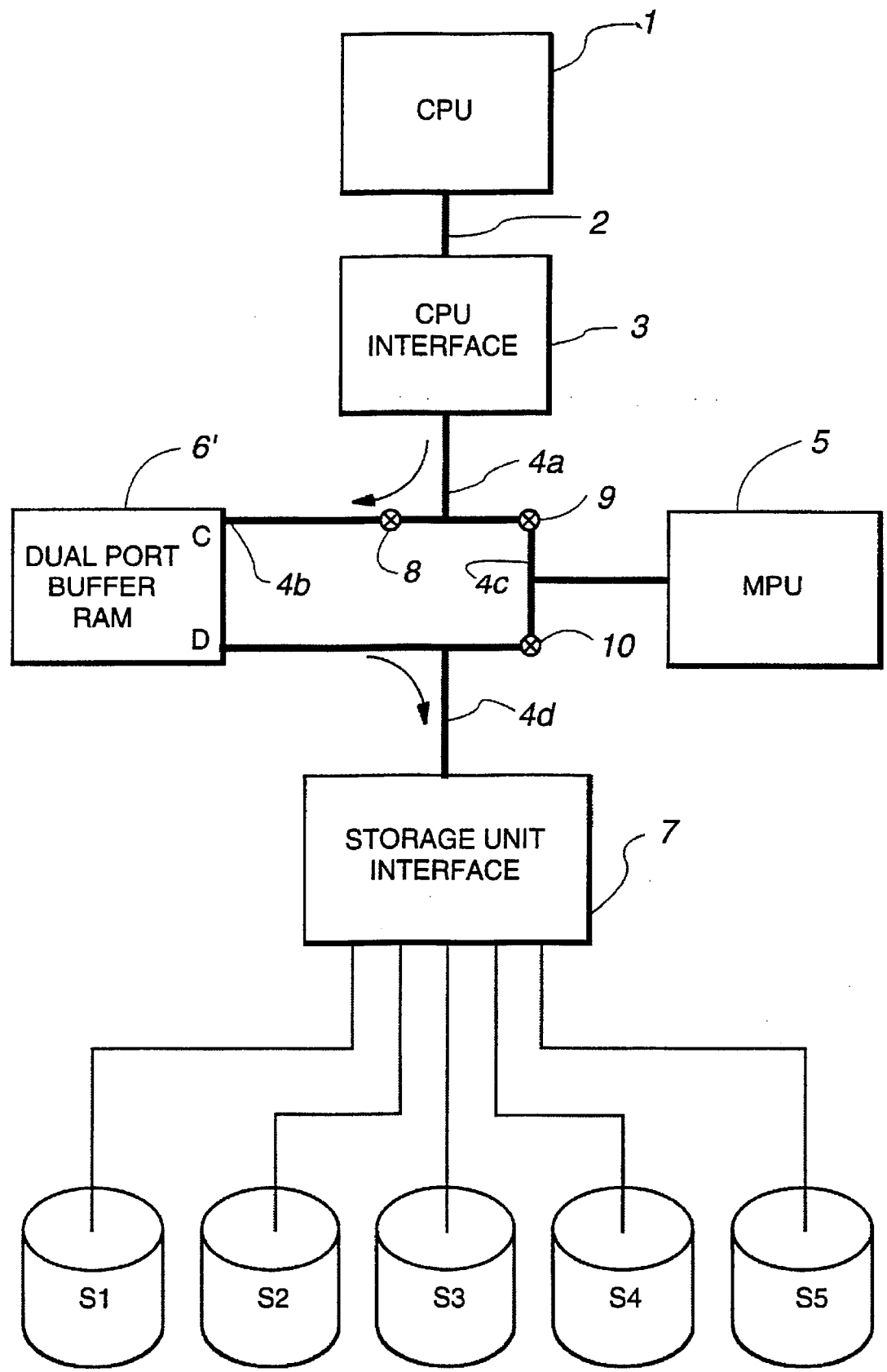
FIG. 2 is block diagram of a the preferred embodiment of the present invention, showing a computer system having a dual port buffer memory in a storage subsystem.

FIG. 2 is block diagram of a the preferred embodiment of the present invention, showing a computer system having a dual port buffer memory in a storage subsystem. A CPU 1 is coupled via a CPU bus 2 to a CPU interface 3 that is part of the storage subsystem. The storage subsystem also includes an MPU 5, a dual port buffer memory 6', a storage unit interface 7, and one or more storage units.

The CPU bus 2 may be any desired bus, such as the well-known VME or SCSI-2 standard busses.

The CPU interface 3 may comprise, for example, 53C720 SCSI-2 interface circuits, available from NCR Corporation.

The MPU 5 may include a microprocessor circuit and supporting circuitry, such as read-only memory to store control programs, and random access memory for use during control program execution. A suitable microprocessor circuit is the MIPS R3000 RISC processor, made by MIPS Corporation of Sunnyvale, Calif.

The storage unit interface 7 may comprise, for example, 53C700 or 53C71 0 SCSI-2 interface circuits, available from NCR Corporation. If the bandwidth of the storage unit interface 7 cannot accommodate the bandwidth of the internal data bus 4, then the storage unit interface can be configured with two or more sets of interface circuits, each supporting a set of storage units, with data multiplexed between the plurality of sets of interface circuits, in known fashion.

If the storage subsystem uses a redundant array storage system, a plurality of storage units S1–S5 are coupled to the storage unit interface 7 (five storage units are shown by way of illustration only). In a non-RAID system, one or more non-redundant storage units would be coupled to the storage unit interface 7.

In the present invention, instead of having a single internal bus within the storage subsystem, the bus 4 instead has at least four branches, separated by controllable switching elements. In particular, the CPU interface 3 is coupled to a first port C of the dual port buffer memory 6' by a first bus branch 4a, a CPU-Buffer switch 8, and a second branch 4b. The CPU interface 3 is also coupled to the MPU 5 by the first bus branch 4a, a CPU-MPU switch 9, and a third bus branch 4c. Finally, the MPU 5 is coupled to the storage unit interface 7 and a second port D of the dual port buffer memory 6' by the third bus branch 4c, an MPU-Buffer switch 10, and the fourth bus branch 4d.

The dual port buffer memory 6' preferably comprises video dynamic random access memory (VDRAM) circuits. As is known, VDRAM's have a plurality of data storage locations and two ports for accessing such locations. In the most common form of VDRAM, a first port functions the same as a page-mode dynamic random access memory, using similar control signals. Thus, data can be written to or read from the first port of the VDRAM by supplying an address and appropriate control signals. Depending on VDRAM circuit implementation, data may be accessed through the first port 1 bit, 4 bits, or 8 bits at a time in commonly available integrated circuits (however, the invention does not depend on the bit-width for the first port).

In this same type of commonly available VDRAM, the second port is actually a bidirectional internal parallel load/unload, serial in/out shift register that can hold an entire row (typically 1024 bits) of data read from the VDRAM internal memory or to be written to the VDRAM internal memory. A single operation can transfer a row of data from the internal storage locations in the VDRAM to the shift register, or from the shift register to the internal storage locations in the VDRAM. While access through the first port is suspended during the transfer operation, once the transfer operation is completed, the first port operates independently from the second port. Meanwhile, data can be shifted into or out of the shift register at high speed. Depending on VDRAM circuit implementation, data may be accessed through the second port 1 bit, 4 bits, or 8 bits at a time in commonly available integrated circuits (however, the invention does not depend on the bit-width for the second port).

While the preferred embodiment utilizes standard VDRAM's in implementing the dual port buffer memory 6' for reasons of economy and availability, other circuits could be used to implement the dual port buffer memory 6'. For example, U.S. Pat. No. 4,905,189 describes a dual port memory cell structure where both ports are independently addressable. A circuit comprising such cells could operate without the short interruptions in operation of the page mode port of a VDRAM that occur when transferring a row of data into the shift register side of the VDRAM.

The switches 8, 9, 10 in the subsystem are under the control of the MPU 5, and provide control over the flow of data on the bus 4. Because of the switches 8, 9, 10, the internal bus 4 can be configured in effect to be two internal data busses: one bus for data transfers between the dual port buffer memory 6' and the storage units S1–S5, and a second bus for data transfers between the dual port buffer memory 6' and the CPU 1. The throughput of the storage subsystem is roughly equivalent to the bandwidth of the slower of the two busses.

In one embodiment of the present invention, in which the CPU bus 2 is a 32-bit wide bus (e.g., a SCSI-2 bus) and the internal bus is also 32 bits wide (e.g., a SCSI-2 bus), the dual port buffer memory 6' comprises 8 4-bit/4-bit (i.e., both ports are 4 bits wide) VDRAM's coupled in parallel. The CPU bus 2 can be coupled through bus branch 4a, switch 8, and bus branch 4b to the shift register, or C, port of the dual port buffer memory 6'. The storage unit interface 7 can be coupled through bus branch 4d to the page mode, or D, port of the dual port buffer memory 6'. With commonly available components, this configuration permits burst data transfer rates of about 50 MBytes per second, and sustained data transfer rates of about 35 MBytes per second.

In an alternative embodiment of the present invention, in which the CPU bus 2 is a 64-bit wide bus (e.g., a "wide" SCSI-2 bus) and the internal bus is 32 bits wide, the dual port buffer memory 6' comprises two parallel sets of 8 4-bit/4-bit VDRAM's coupled in parallel. Each of the dual port buffer memory 6' are coupled to separate storage unit controllers 7, functioning in parallel, giving an effective width of 64 bits for the dual port buffer memory 6'. With commonly available components, this configuration permits burst data transfer rates of about 100 MBytes per second, and sustained data transfer rates of about 65 MBytes per second.

In yet another embodiment of the present invention, the dual port buffer memory 6' comprises 32 4-bit/1-bit (i.e., the shift register side is 1 bit wide) VDRAM's coupled in parallel. The CPU bus 2 would still be 32 bits wide, but the bus to the storage unit interface would be in effect 128 bits wide. This width can be accommodated by having 4 32-bit wide standard busses coupled to the D port of the dual port buffer memory 6', and distributing data over parallel sets of storage units. With commonly available components, this configuration permits burst data transfer rates of about 128 MBytes per second, and sustained data transfer rates of about 80 MBytes per second.

Operation of the Invention

The above-described architecture operates as follows for READ and WRITE operations.

A READ operation starts when a READ command from the CPU 1 is received by the MPU 5 through the CPU interface 3. The MPU 5 computes the address of the requested data, and commands the affected storage unit(s) to transfer the desired data into the dual port buffer memory 6' through the D port. In the preferred embodiment, using VDRAM for the dual port buffer memory 6', this transfer operates as a normal direct memory access (DMA) operation using page mode transfer into the VDRAM.

When all of the data has been assembled in the dual port buffer memory 6', the MPU 5 sets up a DMA operation for the C port of the dual port buffer memory 6' to transfer data serially to the CPU interface 3. When the DMA operation starts, the CPU interface 3 reads the assembled data through the C port of the dual port buffer memory 6' and transfers that data to the CPU 1. Concurrently, other data transfers can be made into the D port of the dual port buffer memory 6' from the storage units S1–S5.

When the dual port buffer memory 6' comprises standard VDRAM's, the start of the DMA operation by the CPU interface 3 is accomplished by the CPU interface 3 assuming control of the VDRAM's, applying a row address for the desired data to the VDRAM's, and causing the VDRAM's to transfer the addressed row of data from internal memory into the shift register side of the VDRAM's. The CPU interface then relinquishes control of the VDRAM's, and proceeds to transfer the row of data out of the shift register port (the C port). Concurrently, other data transfers can be made into the D port of the dual port buffer memory 6' from the storage units S1–S5.

A WRITE operation starts when a WRITE command from the CPU 1 is received by the CPU interface 3. The CPU interface 3 writes the data from the CPU 1 through the C port of the dual port buffer memory 6'. Concurrently, other data transfers can be made from the D port of the dual port buffer memory 6' into the storage units S1–S5.

When the dual port buffer memory 6' comprises standard VDRAM's, the start of the WRITE operation by the CPU interface 3 is accomplished by the CPU interface 3 assuming control of the VDRAM's, applying a row address to the VDRAM's, and then relinquishing control of the VDRAM's. The CPU interface 3 then proceeds to transfer a row of data into the shift register side of the VDRAM's (the C port). When the row is filled, or the data transfer is complete, the CPU interface 3 assumes control of the VDRAM's and causes the row of data in the shift register to be transferred into the internal memory of the VDRAM's. Once all of the data from the CPU 1 has been transferred into the dual port buffer memory 6', the MPU 5 causes that data to be transferred from the D port of the dual port buffer memory 6' into the storage units S1–S5.

Meanwhile, when the CPU interface 3 has not assumed control of the VDRAM's during a particular WRITE operation, other data in the VDRAM's (e.g., from previous WRITE operations) can be transferred from the D port of the dual port buffer memory 6' into the storage units S1–S5.

Thus, the dual port buffer memory 6' of the present invention allows concurrent data transfer operations on two independent busses for transfers between the dual port buffer memory 6' and the storage units S1–S5, and between the dual port buffer memory 6' and the CPU 1. When the dual port buffer memory 6' comprises standard VDRAM's, the only time that simultaneous operation on both busses is not possible is when a row of data is transferred between the VDRAM internal memory and the VDRAM shift register. Consequently, because data is transferred over any bus only one time, and the busses within the storage unit controller operate concurrently, the present invention provides a storage subsystem having a higher effective data bus bandwidth than the prior art.

A number of embodiments of the present invention have been described. Nevertheless, it will be understood that various modifications may be made without departing from the spirit and scope of the invention. For example, the function of the preferred VDRAM's can be implemented with separate integrated circuits. Accordingly, it is to be understood that the invention is not to be limited by the specific illustrated embodiment, but only by the scope of the appended claims.

We claim:

1. A data storage subsystem, comprising:
   a processor interface for coupling said data storage subsystem to a computer processor;
   a redundant array of storage units for redundantly storing data, such that said redundant array provides protection against a loss of data;
   a storage unit interface;
   a subsystem processor for controlling operation of said data storage subsystem;
   a dual-port buffer memory having a first port for serially transferring data between said dual-port buffer memory and said processor interface, and having a second port for transferring data between said dual-port buffer memory and said storage unit interface;
   wherein data transfers by said first and second ports are allowed to be concurrent and are controlled by said subsystem processor;
   wherein data transfers by said first and second ports are substantially independent of each other;
   wherein data exits said dual-port buffer memory in the order that data enters said dual-port buffer memory, such that locations at which data is stored within said dual-port buffer memory need not be addressed;
   first, second, third, and fourth bus branches;
   first, second, and third bus switches controlled by said subsystem processor;
   a first series connection comprising said first bus branch, said first bus switch, and said second bus branch interconnecting said first port of said dual-port buffer memory and said processor interface;
   a second series connection comprising said first bus branch, said second bus switch and, and said third bus branch interconnecting said system processor and said processor interface;
   a third series connection comprising said third bus branch, said third bus switch, and said fourth bus branch interconnecting said system processor and said storage unit interface; and
   a fourth connection comprising said fourth bus branch interconnecting said storage unit interface and said second port of said dual-port buffer memory.

2. The data storage subsystem of claim 1 wherein said dual-port buffer memory is a video dynamic random access (VDRAM) memory.

3. The data storage subsystem of claim 2 wherein said first port of said VDRAM includes a shift register for transferring data into and out of said VDRAM.

4. A computer system, comprising:
   a computer processor;

a processor interface;

a computer bus interconnecting said computer processor and said processor interface;

a redundant array of storage units for redundantly storing data, such that said redundant array provides protection against a loss of data;

a storage unit interface;

a subsystem processor;

a dual-port buffer memory having a first port for serially transferring data between said dual-port buffer memory and said processor interface, and having a second port for transferring data between said dual-port buffer memory and said storage unit interface;

wherein data transfers through said first and second ports are allowed to be concurrent and are controlled by said subsystem processor;

wherein data transfers through said first and second ports are substantially independent of each other;

wherein data exits said dual-port buffer memory in the order that data enters said dual-port buffer memory, such that locations at which data is stored within said dual-port buffer memory need not be addressed;

first, second, third, and fourth bus branches;

first, second, and third bus switches controlled by said subsystem processor;

a first series connection comprising said first bus branch, said first bus switch, and said second bus branch interconnecting said first port of said dual-port buffer memory and said processor interface;

a second series connection comprising said first bus branch, said second bus switch and, and said third bus branch interconnecting said system processor and said processor interface;

a third series connection comprising said third bus branch, said third bus switch, and said fourth bus branch interconnecting said system processor and said storage unit interface; and a fourth connection comprising said fourth bus branch interconnecting said storage unit interface and said second port of said dual-port buffer memory.

5. The computer system of claim 4 wherein said dual-port buffer memory is a video dynamic random access (VDRAM) memory.

6. The computer system of claim 5 wherein said first port of said VDRAM includes a shift register for transferring data into and out of said VDRAM.

7. A method ensuring that data does not cross the same data bus twice when data is written from a computer processor to a redundant array of storage units, or when data is read from said redundant array of storage units, the method comprising the steps of:

providing a processor interface that is coupled to said computer processor by way of a data bus;

providing a redundant array of storage units for redundantly storing data, such that protection is provided against loss of data;

providing a storage unit interface;

providing a subsystem processor;

providing a dual-port buffer memory having a first port for serially transferring data between said dual-port buffer memory and said processor interface, and having a second port for transferring data between said dual-port buffer memory and said storage unit interface;

wherein data transfers through said first and second ports are allowed to be concurrent and are controlled by said subsystem processor;

wherein data transfers through said first and second ports are substantially independent of each other;

wherein data exits said dual-port buffer memory in the order that data enters said dual-port buffer memory, such that locations at which data is stored within said dual-port buffer memory need not be addressed;

providing first, second, third, and fourth data bus branches;

providing first, second, and third bus switches that are controlled by said subsystem processor;

providing a first series connection comprising said first data bus branch, said first bus switch, and said second data bus branch interconnecting said first port of said dual-port buffer memory and said processor interface;

providing a second series connection comprising said first data bus branch, said second bus switch and, and said third data bus branch interconnecting said system processor and said processor interface;

providing a third series connection comprising said third data bus branch, said third bus switch, and said fourth data bus branch interconnecting said system processor and said storage unit interface; and providing a fourth connection comprising said fourth data bus branch interconnecting said storage unit interface and said second port of said dual-port buffer memory.

* * * * *